US008980485B2

(12) United States Patent
Lanning et al.

(10) Patent No.: US 8,980,485 B2
(45) Date of Patent: Mar. 17, 2015

(54) RECHARGEABLE, THIN-FILM, ALL SOLID-STATE METAL-AIR BATTERY

(71) Applicant: ITN Energy Systems, Inc., Littleton, CO (US)

(72) Inventors: Bruce Roy Lanning, Littleton, CO (US); Michael Wayne Stowell, Jr., Loveland, CO (US); Brian Spencer Berland, Morrison, CO (US); Andrew Colclasure, Littleton, CO (US)

(73) Assignee: ITN Energy Systems, Inc., Littlton, CO (US)

( * ) Notice: Subject to any disclaimer, the term of this patent is extended or adjusted under 35 U.S.C. 154(b) by 46 days.

(21) Appl. No.: 13/731,554

(22) Filed: Dec. 31, 2012

(65) Prior Publication Data

US 2013/0171527 A1    Jul. 4, 2013

Related U.S. Application Data

(60) Provisional application No. 61/582,124, filed on Dec. 30, 2011.

(51) Int. Cl.
*H01M 8/22* (2006.01)
*H01M 12/08* (2006.01)
*H01M 4/86* (2006.01)
*H01M 4/38* (2006.01)

(52) U.S. Cl.
CPC .............. *H01M 12/08* (2013.01); *H01M 4/861* (2013.01); *H01M 4/382* (2013.01); *Y02E 60/50* (2013.01)
USPC ......................................... 429/405

(58) Field of Classification Search
CPC ...... Y02E 60/12; Y02E 60/122; H01M 12/06; H01M 12/08; H01M 4/8605; H01M 2004/8689; H01M 4/382; H01M 4/861
USPC .......................................... 429/403, 405, 406
See application file for complete search history.

(56) References Cited

U.S. PATENT DOCUMENTS

| 6,139,987 | A  | 10/2000 | Koo et al.     |
| 6,392,387 | B1 | 5/2002  | Sage et al.    |
| 6,515,787 | B1 | 2/2003  | Westfall et al.|

(Continued)

OTHER PUBLICATIONS

PCT International Search Report and Written Opinion in International Application PCT/US2012/056685, mailed Nov. 30, 2012, 8 pgs.

(Continued)

*Primary Examiner* — Stewart Fraser
(74) *Attorney, Agent, or Firm* — George C. Lewis; Merchant & Gould P.C.

(57) ABSTRACT

This disclosure describes metal-air battery devices that are rechargeable, thin film, and all solid-state. The disclosure further describes methods of manufacturing rechargeable, thin film, all solid-state, metal-air batteries. The devices disclosed include a porous cathode structure with an electrolyte incorporated therein. The porous cathode structure may be designed to contain pores of at least two distinct sizes (i.e., having bimodal pore size distribution), a smaller one to increase the active surface area of the cathode and a larger to facilitate the transport of gas-phase oxygen through the cathode. The methods disclosed include using pulsed microwave plasma enhanced chemical vapor deposition (p-μPECVD) to dynamically grow an electrolyte layer on the surface of the carbon within, or a desired portion of, the cathode structure.

11 Claims, 2 Drawing Sheets

(56) References Cited

U.S. PATENT DOCUMENTS

| | | | |
|---|---|---|---|
| 6,753,108 B1* | 6/2004 | Hampden-Smith et al. | 429/406 |
| 6,822,778 B2 | 11/2004 | Westfall et al. | |
| 6,856,444 B2 | 2/2005 | Ingalls et al. | |
| 6,967,183 B2* | 11/2005 | Hampden-Smith et al. | 502/101 |
| 7,009,750 B1 | 3/2006 | Westfall et al. | |
| 7,087,341 B2* | 8/2006 | Hampden-Smith et al. | 429/406 |
| 7,126,091 B1 | 10/2006 | Westfall et al. | |
| 7,133,181 B2 | 11/2006 | Greer | |
| 7,145,709 B1 | 12/2006 | Westfall et al. | |
| 7,215,457 B1 | 5/2007 | Westfall et al. | |
| 7,265,890 B1 | 9/2007 | Demiryont | |
| 7,265,891 B1 | 9/2007 | Demiryont | |
| 7,277,215 B2 | 10/2007 | Greer | |
| 7,362,490 B2 | 4/2008 | Park | |
| 7,372,610 B2 | 5/2008 | Burdis et al. | |
| 7,531,239 B2 | 5/2009 | Demiryont | |
| 7,586,667 B2 | 9/2009 | Demiryont | |
| 7,593,154 B2 | 9/2009 | Burdis et al. | |
| 7,619,804 B1 | 11/2009 | Demiryont | |
| 7,666,233 B2* | 2/2010 | Visco et al. | 29/623.1 |
| 7,704,555 B2 | 4/2010 | Demiryont | |
| 7,830,585 B2 | 11/2010 | Widjaja et al. | |
| 8,048,571 B2* | 11/2011 | Visco et al. | 429/231.95 |
| 8,202,649 B2* | 6/2012 | Visco et al. | 429/209 |
| 2003/0049517 A1* | 3/2003 | Hampden-Smith et al. | 429/44 |
| 2004/0067417 A1 | 4/2004 | Oosawa et al. | |
| 2004/0185336 A1 | 9/2004 | Ito et al. | |
| 2007/0012244 A1 | 1/2007 | Klaassen | |
| 2007/0051620 A1 | 3/2007 | Visco et al. | |
| 2009/0159582 A1 | 6/2009 | Chami et al. | |
| 2010/0086851 A1 | 4/2010 | Wang et al. | |
| 2010/0227214 A1 | 9/2010 | Krasnov et al. | |
| 2011/0117417 A1 | 5/2011 | Pitts | |
| 2013/0078535 A1* | 3/2013 | Aizawa | 429/403 |
| 2013/0101751 A1 | 4/2013 | Berland et al. | |
| 2013/0154113 A1 | 6/2013 | Frey | |
| 2013/0157152 A1 | 6/2013 | Lanning et al. | |
| 2013/0201545 A1 | 8/2013 | Frey et al. | |
| 2013/0224590 A1 | 8/2013 | Divigalpitiya | |
| 2014/0227609 A1 | 8/2014 | Frey et al. | |

OTHER PUBLICATIONS

U.S. Appl. No. 13/717,364, Notice of Allowance mailed Sep. 18, 2013, 9 pgs.
U.S. Appl. No. 13/758,468, Notice of Allowance mailed Jun. 9, 2014, 9 pgs.
Electric Power Research Institute, Development of Flexible Electrochromic Films, 1018525, Technical Update, Dec. 2009, EPRI Project Manager: K.R. Amarnath, 2009, 42 pgs.
U.S. Appl. No. 13/717,215, Office Action mailed Jan. 8, 2015, 17 pgs.
U.S. Appl. No. 13/758,468, Notice of Allowance mailed Dec. 22, 2014, 9 pgs.

* cited by examiner

RECHARGEABLE, THIN-FILM, ALL SOLID-STATE METAL-AIR BATTERY

RELATED APPLICATIONS

This application claims the benefit of U.S. Provisional Application No. 61/582,124, filed Dec. 30, 2011, which application is hereby incorporated by reference.

INTRODUCTION

Metal-air batteries, with their open cell structure, have the potential, with theoretical energy densities on the order of hydrocarbon fuels (11 kWh/kg for organic electrolyte; $Li_2O_2$ discharge product and 6 kWh/kg for alkaline electrolyte; LiOH discharge product) to meet electric vehicle and other portable power requirements. Metal-air batteries can be used in a variety of devices, from small batteries used in hearing aids, to batteries used in portable electronic devices such as personal computing devices, phones, or cameras, to large batteries used in electric vehicle propulsion. Despite the desirable energy densities, 'round trip' efficiencies, practical energy densities, rate capability and lifetimes of current rechargeable metal-air battery designs are lower than desired.

Lithium, with an energy density higher than other practical metal candidates, serves as the ideal anode material for the metal-air chemistry. While having a higher energy density than other practical metal candidates, managing reactivity and/or stability of lithium metal and its reaction products in combination with oxygen are critical to a successful lithium-air battery design. Further, there are common technical challenges associated with insoluble lithium reaction product formation, efficiency of the bi-functional oxygen electrode (high polarization resistance), management of water and impurities, such as $CO_2$, and stability and/or reactivity and reversibility of the lithium metal anode and electrolyte.

It is with respect to these and other considerations that embodiments have been made. Also, although relatively specific problems have been discussed, it should be understood that the embodiments should not be limited to solving the specific problems identified herein.

Rechargeable, Thin-Film, all Solid-State Metal-Air Battery

This disclosure describes metal-air battery devices that are rechargeable, thin film, and all solid-state. The disclosure further describes methods of manufacturing rechargeable, thin film, all solid-state, metal-air batteries. The devices disclosed include a porous cathode structure with an electrolyte incorporated therein. The porous cathode structure may be designed to contain pores of at least two distinct sizes (i.e., having bimodal pore size distribution), a smaller one to increase the active surface area of the cathode and a larger to facilitate the transport of gas-phase oxygen through the cathode. The methods disclosed include using pulsed microwave plasma enhanced chemical vapor deposition (p-μPECVD) to dynamically grow an electrolyte layer on the surface of the carbon within, or a desired portion of, the cathode structure.

In part, this disclosure describes a metal-air battery. The battery includes:
  a) a metal source layer;
  b) an electrolyte layer between the metal source layer and a porous composite cathode layer; and
  c) the porous composite cathode layer having a first portion and a second portion, the porous composite cathode including conductive material deposited onto a support structure to form a porous conductive structure; wherein solid electrolyte with metal ion conductivity has been deposited on surfaces within the first portion of the porous conductive structure; wherein the first portion is in contact with the electrolyte layer and the second portion includes a porous conductive material in contact with the first portion.

Yet another aspect of this disclosure describes a method for manufacturing a metal-air battery that includes: fabricating a gas porous conductive carbon structure on a support structure; depositing an electrolyte on at least part of the porous structure to obtain a gas porous composite cathode; forming a dense electrolyte layer on the electrolyte on at least part of the porous conductive carbon structure; and depositing an anode on the dense electrolyte layer.

The disclosure further describes a lithium-air battery including:
  a) a lithium source layer;
  b) a LiPON layer in contact with the lithium source layer;
  c) a gas porous composite cathode of a bimodal porous carbon layer deposited onto a support structure, the composite cathode having a first portion and a second portion; wherein a layer of solid electrolyte with lithium ion conductivity has been deposited within the bimodal porous carbon layer in the first portion and a thicker layer of solid electrolyte has been deposited on the second portion and the second portion in contact with the layer of LiPON; and
  d) a gas diffusion layer comprising a porous conductive material in contact with the first portion of the composite cathode.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are illustrating examples and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

Figure 1:
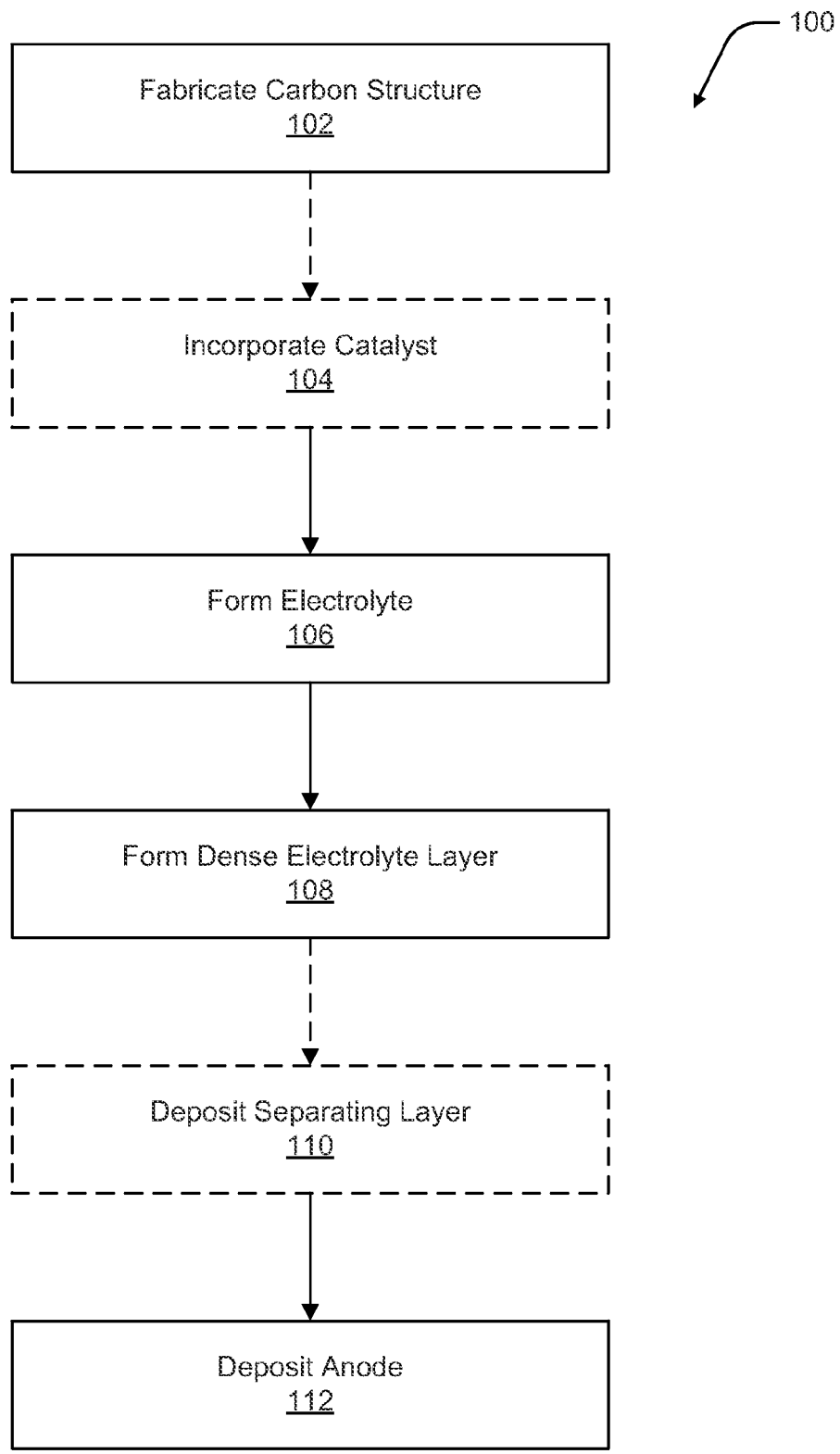
FIG. 1 illustrates a method to manufacture a rechargeable, thin film, all solid state metal-air battery.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. The following detailed description is, therefore, not to be taken in a limiting sense.

Embodiments are directed to a proposed Metal-Air Battery with Solid State Design (hereinafter the "device") and specifically to a process to fabricate such a device. The process is designed for fabrication of a metal-air battery to maximize the ratio of active to inactive material and therefore practical energy density, be cycled at a high rate, increase durability, minimize moisture and impurity effects, avoid irreversible reaction product formation at cathode and anode surface, maximize thermodynamic stability, and increase reaction sites. The device is fabricated with a process that creates a solid state metal-air battery with thin layers and high performance. Lithium-air batteries are categorized according to the type of electrolyte used: organic liquid electrolyte (lithium salt dissolved in organic solvent), aqueous, hybrid (aqueous and organic liquid electrolytes), hybrid solid-state, and all solid-state. There are common technical challenges associated with insoluble lithium reaction product formation, efficiency of the bi-functional oxygen electrode (high polarization resistance), management of water and impurities, such as $CO_2$, and stability/reactivity and reversibility of the lithium metal anode and electrolyte.

Although the above challenges have a dramatic effect on limiting rate, capacity, and lifetime performance of lithium-air batteries, the primary challenge from a practical perspective, is how to engineer a battery that addresses the above technical challenges with a mass and volume in-line with the potentially high energy density presented above. In particular, when taking into account the mass of current battery components and architectures at an integrated system level, as shown in Table 1 below, the resulting practical energy density (given in Wh/kg) is not much better than current lithium ion technology. However, the disclosed rechargeable thin film, solid state device addresses the mass issue at the system level for a higher overall practical energy density.

A thick-film, hybrid, solid-state electrolyte system demonstrated by Kumar attempts to address electrolyte instability within the composite cathode and reactivity at the lithium anode by utilizing a Li-ion conducting solid electrolyte separator, i.e., glass-ceramic and polymer-ceramic material laminate, and a solid state composite air cathode, i.e., carbon and ionically conducting ceramic powders. The "solid-state" battery design of Kumar has shown good thermal stability, inherent safety, and rechargeability in the range of 30-105° C. With typical ceramic processing, the high ionic conductivity of the lithium aluminum germanium phosphate (LAGP) has only been demonstrated when the material is formed into a dense disk by melting and pressing/sintering at 1350° C. and 850° C., respectively. Within the porous cathode structure, the LAGP can only be sintered to 240-300° C. due to restraints from carbon oxidation. Thus, the conductivity of the LAGP within the composite cathode structure is considerably lower than that of the pressed/sintered disk. Furthermore, there still remain challenges with efficiency at the air cathode, management of reaction products and reversibility of the lithium anode. In addition, a pseudo solid state construction that utilizes typical ceramic processes will result in thick films (~1000 microns), that will reduce the overall energy density and reduce rate capability due to long diffusion lengths.

The disclosed device design, on the other hand, utilizes thin-film techniques during the layer manufacturing process (vacuum deposition, in-situ formation, etc.) and results in layers that are submicron up to a hundred microns. Thus, the disclosed lithium air device design fabrication process maximizes the ratio of active/inactive material and can be cycled at a high rate.

Ultimately, the realizable energy density of the metal-air system is dependent on the specific design and associated volume and mass required to address the specific technical challenges. Because the oxygen kinetics occurring at the air cathode are relatively slow, achieving a high current density requires that the electrochemical reaction occurs at all of the internal cathode surfaces. Thus, the electrolyte network must be capable of conducting lithium-ion throughout the thickness of the cathode while not blocking gas-phase oxygen

TABLE 1

Disclosed solid state device overcomes practical limitations of competing technologies.

| Electrolyte | Open Circuit Voltage (V) | Energy Density - Theoritical | Energy Density - Practical | Cycle Lifetime | Major Problem |
|---|---|---|---|---|---|
| Disclosed Solid State - Thin Film | 2.9 | 11,000 | 800-1200 (estimated) | >2,000 (theoretical) | |
| Organic Solvent | 2.9 | 11,000 | 500-1000 | 50 | Poor cycle lifetime and Poor Rate Capability |
| Aqueous - Basic | 3.7 | 6,000 | 300-600 | 200 | Low Energy Density/ Water management |
| Aqueous - Acidic | 4.2 | 3,000 | 400-700 | 200 | Safety concerns and poor lifetime |
| Hybrid (Organic/Aqueous) | 3.7 | 6,000 | 300-500 | 200 | Low Energy Density/ Cell Complexity |
| Hybrid Solid State (Thick Film, Solid State/Polymer Ceramic) | 2.9 | 11,000 | <300 | 1000 | Poor rate capability and low energy density | pathways. Consequently, the fabrication of an open, stable electrolyte network with high lithium-ion conductivity is critical to the demonstration of a high performance lithium-air battery. Unfortunately, the two existing choices (liquid electrolyte or hybrid thick film) are constrained in that they achieve either high conductivity or high stability, but not both.

Liquid electrolyte systems provide adequate Li-ion conductivity (1-10 mS/cm) within the composite air cathode structure. However, these electrolyte systems suffer from poor lifetime due to electrolyte reactivity and evaporation. Furthermore, rate capability is limited with a liquid system because the electrolyte floods cathode pores. Thus, the oxygen must be transported to triple phase boundaries through the liquid electrolyte. Transport of oxygen within these liquids is sluggish due to low solubility limits.

The hybrid thick-film solid-state electrolyte system helps solve the problem of electrolyte instability with discharge product intermediates. However, the practical energy density is low because the typical ceramic processing methods used produce a three-layer separator with a thickness around 1 mm resulting in a high inactive to active material ratio. Further, the composite cathode is also around 1 mm thick and a significant fraction of the cathode is inactive due to sluggish transport. The relatively long lithium-ion diffusion pathways lead to poor rate capability. Because the cathode must be sintered at low temperature to avoid carbon oxidation, the ionic conductivity of the ceramic electrolyte within the cathode is also prohibitively low.

To address these shortcomings in the prior art, embodiments of a thin film, all solid state metal-air battery are proposed. Embodiments of the proposed thin film, all solid state metal-air battery designs are anticipated to provide improved cycle lifetime (inorganic electrolyte is stable with $O^{2-}$), maximize the overall energy density (minimize inactive to active material ratio) and improve rate capability (short diffusion pathways/high ionic conductivity). The designs utilize low cost processing in combination with a lightweight, thin film design utilizing advanced deposition techniques that incorporates: an all solid-state, three-dimensional, porous, electrolyte network with high lithium-ion conductivity formed in situ within the composite cathode structure at low temperatures using pulsed microwave plasma enhanced chemical vapor deposition (p-µPECVD); lightweight, functionalized, high surface area, composite carbon/solid-state electrolyte air cathode structure with bimodal pore distribution and inter-penetrating, solid state ion conducting electrolyte and bi-functional catalyst; fully reversible, thermodynamically stable, metal anode design in combination with integrated solid state lithium ion conductor; and integrated, thin-film design suitable for bi-polar planar or tubular configuration.

For the air electrode, a versatile, scalable, processing methodology is proposed to address the issue of electrolyte instability, oxide reaction product "fouling", oxygen solubility and transport, and efficient oxygen evolution and reduction. More importantly, the proposed design and processing will create a lightweight cathode structure that minimizes the inactive mass of the structure and thereby maximize the realizable, practical energy density of metal-air chemistry. To create the cathode structure, a porous carbon structure is formed and then post treated to form a functionalized, high surface area porous structure. It is proposed that structure having a bimodal pore distribution will facilitate both a large effective surface area as well as effective gas transport through the structure. A further benefit of the microwave processing is that it allows uniform doping of copper into the cathode to enhance electrical conductivity to support high rate operation.

To support reversible plating and dissolution of metal from the anode, a thin film separator with sufficient ionic conductivity and stability is deposited over the cathode. Metal is then deposited onto the thin film separator using dc sputtering, thermal evaporation, electronic-beam evaporation, or other deposition techniques. Unlike organic liquid electrolytes, solid state separators can be stable at anode operating potentials and will not form a resistive solid electrolyte interface (SEI) that irreversibly consumes active anode material. The solid layer also blocks metal dendrite formation.

FIG. 1 illustrates a method 100 to manufacture a rechargeable, thin film, all solid state metal-air battery. The method 100 includes a fabricate carbon structure operation 102. During the fabricate carbon structure operation 102 a porous carbon structure is fabricated and then post treated to form a functionalized, high surface area porous structure. In another embodiment, a yttria-stabilized zirconia (YSZ) on lanthanum strontium manganite (LSM) cathode is used. In an embodiment the carbon structure is bi-modal, or contains a pores distribution having two modes in which the different pore sizes are provided for at least two different purposes. In an embodiment, the carbon structure's pore distribution contains a relatively large proportion of micropores, or pores 2-30 nm, in size, and macropores, or pores 0.1-1 micron in size. Micropores are used to increase the active surface area of the carbon to help facilitate reactions necessary for battery functions. Macropores are used to more efficiently transport oxygen through the carbon structure which increases the efficacy of the battery. In embodiments, the bimodal distribution may be defined as a pore distribution in which the two highest modes include a peak in the distribution within the range of 2-50 nm and the peak of the second mode between 0.05 and 10 microns or more preferably 0.1 and 1 microns. Other peaks may be present but as a bimodal distribution must be less than the two main peaks described above. In an embodiment, engineered bi-modal pore distribution in the air cathode are anticipated to provide for optimum power/capacity performance; a first pore size for gas-phase oxygen transport and a second pore size for high catalytic surface area. Furthermore, the pore size distribution may be altered to include additional modes as is known in the art. In an embodiment, the porous carbon structure is formed on a support structure such as but not limited to carbon, nickel foam, metal foam, aluminum mesh, metal mesh, and any other material suitable for use as a lightweight, electrically conductive support structure.

As discussed below with reference to FIG. 2, an embodiment of the device may be designed so that the cathode is further connected on one side to a carbon structure with a larger average pore size whose purpose is to act as a manifold to the active cathode portion that, when completed, will be covered with a thin layer of electrolyte.

The method 100 further includes an optional incorporate catalyst operation 104. During the incorporate catalyst operation 104 a catalyst is incorporated into the carbon structure. In an embodiment, the catalyst is bi-functional, or is used to help perform two or more functions. The catalyst may help the battery discharge by catalyzing the formation of $Li_2O_2$. The catalyst may further help the battery charge by catalyzing the reaction of $Li_2O_2$ into lithium and oxygen. In an embodiment at least two different materials are used as a catalyst such as but not limited to $MnO_2$, Pt, Au, Ir, Rh, Ru, $Co_3O_4$, and any combination or variation thereof, though any material suitable to catalyze a reaction may be used. It should be noted that the incorporate catalyst operation 104 is optional although it is anticipated to improve the performance of the device. The battery will function without the use of a catalyst, but may function better with a catalyst. In yet another alternative process, the incorporate catalyst operation 104 may be performed during other operations or at a different point in the process than illustrated herein in order to achieve desired performance of the device.

In an alternative process (not shown), the catalyst may be incorporated into the carbon structure during the fabricate carbon structure operation 102. Such an alternative process may be adapted so that the catalyst is preferentially located at or near the exposed carbon surface in order to more efficiently catalyze the reactions.

In the embodiment shown, the method 100 further includes a form electrolyte operation 106. During the form electrolyte operation 106 an electrolyte is incorporated into at least part of the carbon structure. An enabling feature of the disclosed design is the deposition of a solid-state electrolyte with high ionic conductivity deep within a bi-modal porous carbon structure to create a lightweight, thin electrolyte structure wherein the 'functionalization' at triple phase boundaries minimizes precipitate fouling and maximizes transport of metal ions and oxygen within a low mass structure (for optimum energy density). While there are a number of solid, doped lithium oxides with sufficiently high ionic conductivity, i.e. 0.1-1 $mS/cm^2$, when the correct phase/structure is achieved; creation of the correct phase/structure traditionally requires high temperature processes that are not compatible with integration into such a highly functionalized 3D porous carbon networks. As a result, thick solid electrolytes or liquid electrolyte systems are typically employed with the resulting limitations to battery durability or performance as previously described.

To prevent thick layers, embodiments of the device and process may preferably use p-μPECVD during the form electrolyte operation 106. In an embodiment, the microwave power source is pulsed creating periods with a high concentration of reactive species (i.e., film growth) and low concentration (i.e., time for precursor species to diffuse into the porous network). By adjusting and/or modulating the plasma frequency, one can control the growth dynamic thereby ensuring conformal growth throughout the entire structure rather than localized growth at the first solid-gas interface. Further, the plasma offers the ability to control the ion energetics near the cathode surface to control densification of the glassy electrolyte at low temperatures. As a result, thin film, solid state electrolytes with high ionic conductivity can be achieved at low temperatures and more importantly within an optimized lightweight carbon cathode. In an embodiment, the plasma contains gaseous precursors to the desired electrolyte as well as an inert background gas such as but not limited to argon and oxygen. In an embodiment, the electrolyte contains ceramic, glass, polymer, polymer-ceramic composite, glass-ceramic composite, lithium aluminum germanium phosphate (LAGP), lithium aluminum titanium phosphate (LATP), lithium lanthanum titinate (LLT), and YSZ. It should be noted that in an embodiment, the incorporate catalyst operation 104 and the form electrolyte operation 106 may be performed in any order, simultaneously, or quasi-simultaneously.

The method 100 further includes a form dense electrolyte layer operation 108. During the form dense electrolyte layer operation 108 a layer of electrolyte is formed. In an embodiment, a layer of electrolyte is formed in a method similar to that described above for the form electrolyte operation 106. In another embodiment, a layer of electrolyte is formed on one end of the carbon cathode using p-μPECVD or slip/tape casting. The electrolyte layer formed in the form dense electrolyte layer operation 108 may or may not be incorporated into a portion of the carbon structure (i.e., penetrate the structure) but, in either case, is in intimate contact with the electrolyte formed during the form electrolyte operation 106 thereby creating a high ionic conductivity between the electrolyte of the cathode and the dense electrolyte layer. In an embodiment the dense electrolyte layer contains the same material as the electrolyte.

The method 100 further includes a deposit separating layer operation 110. During the deposit separating layer operation 110 a layer is deposited that may be used to physically separate the dense electrolyte layer from another layer. In an embodiment, a thin film separator with sufficient ionic conductivity and stability is deposited over the dense electrolyte layer to support reversible plating and dissolution of metal from an anode. In an embodiment, the thin layer is deposited over the dense electrolyte using RF sputtering or pulsed DC deposition. In an embodiment, a thin layer of LiPON is deposited to separate the dense electrolyte layer from an anode. In an embodiment, the thin layer contains lithium phosphate oxynitride (LiPON), ceramic, glass, LAGP, LATP, LLT, or YSZ. It should be noted that the deposit separating layer operation 110 is optional and is not performed in every embodiment.

The method 100 further includes a deposit anode operation 112. During the deposit anode operation 112 an anode is deposited. The anode functions as a source for metal ions and as such may be any material suitable for supplying metal ions such as but not limited to lithium, zinc, aluminum, magnesium, molybdenum, iron, nickel, carbon, graphite, graphene, tin, and any combination or variation thereof. In an embodiment, the anode is deposited using thermal evaporation. In an embodiment, a lightweight, electrically conductive, support structure is formed on the anode to provide physical support as well as provide a point of contact for the anode.

Figure 2:
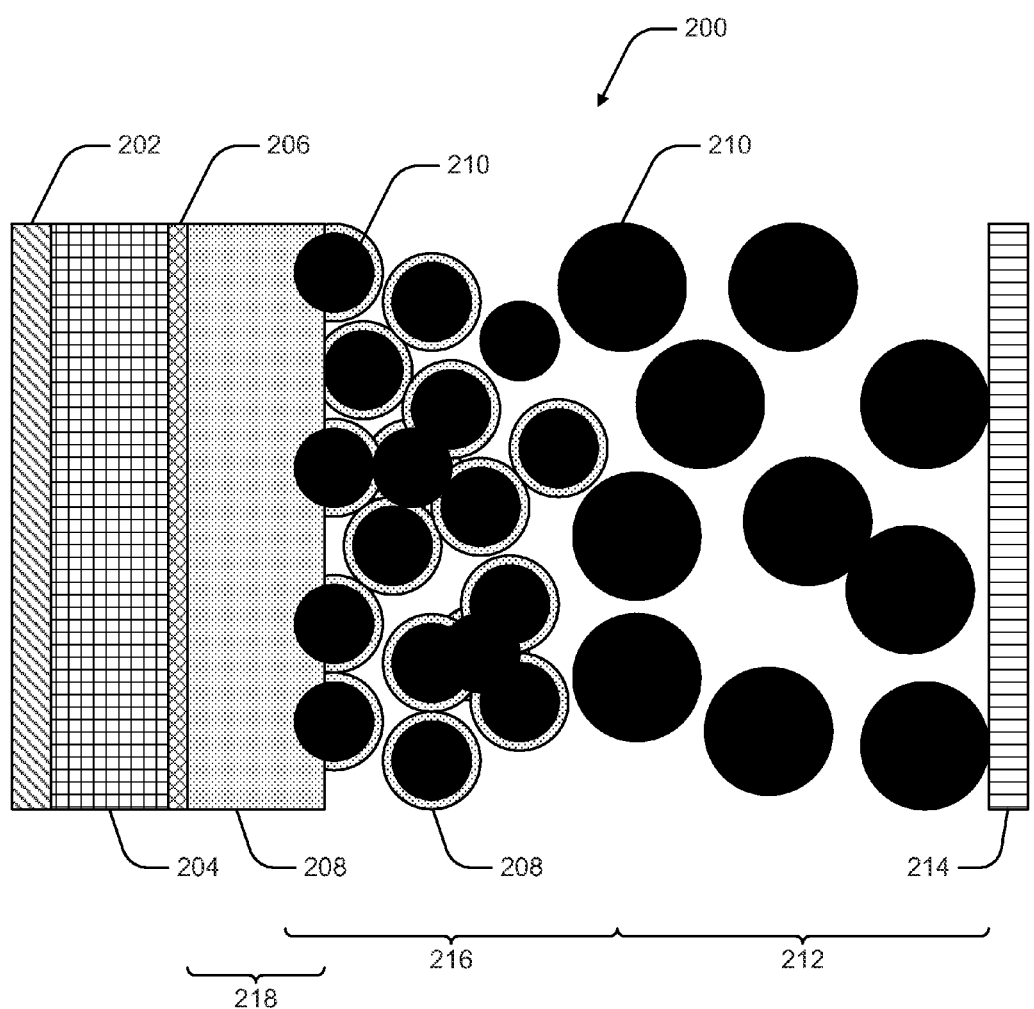
FIG. 2 illustrates an embodiment of a rechargeable, thin film, all solid state metal-air battery.

FIG. 2 illustrates an embodiment of a rechargeable, thin film, all solid state metal-air battery 200. The battery 200 includes an anode current collector 202. The anode current collector serves as a point of contact for an anode 204. In an embodiment the anode current collector is carbon, nickel foam, metal foam, aluminum mesh, metal mesh, and any other material suitable for use as a lightweight, electrically conductive support structure. Further, the anode current collector 202 is in contact with the anode 204. The anode 204 is a source for metal-ions to be used throughout the device. In an embodiment, the anode 204 is lithium though it may be any material suitable for supplying metal-ions, such as but not limited to zinc, aluminum, magnesium, molybdenum, iron, nickel, carbon, graphite, graphene, tin, and any combination or variation thereof. In an embodiment, the anode current collector 202 and the anode 204 are a single, or the same, layer.

In an embodiment the battery 200 further includes a thin film separating layer 206 in contact with the anode 204. In an embodiment, the thin film layer 206 is about 1 micron thick and contains LiPON, ceramic, glass, LAGP, LATP, LLT, or YSZ. In an embodiment, the thin film layer 206 is deposited on a dense electrolyte layer using RF sputtering or pulsed DC deposition. In another embodiment the thin film separating layer 206 is optional and/or not present in the battery 200.

The bimodal carbon structure 210 as described above is illustrated as a series of overlapping solid circles to show the porous nature of the structure. The carbon structure 210 may be created by depositing carbon onto a lightweight support structure (not shown) so that the deposited carbon forms the bimodal porous matrix as a layer on the support structure. In an embodiment, the lightweight support structure may itself be carbon or, alternatively may be a structure created from any suitable material such as, for example, nickel foam, metal foam, aluminum mesh, metal mesh, and/or any other material suitable for use as a lightweight, electrically conductive support structure.

On some or all of the porous carbon structure 210, electrolyte 208 has been deposited creating the working composite cathode 216. On one side of the cathode 216, the dense layer 218 of electrolyte 208 has been deposited. As described above, this dense layer 218 may or may not penetrate the cathode 216 while providing an electrical contact between the cathode 216 and the thin film layer 206.

The electrolyte 208 in the dense layer 218 and deposited on surfaces within at least a portion of the porous carbon structure 210 may be formed using p-µPECVD. Alternatively, any other suitable method for depositing the electrolyte 208 onto the surfaces within the porous structure may be used. In an embodiment, the electrolyte 208 includes a dense layer 218 of electrolyte, ~10 microns thick, as well as a thin layer of solid electrolyte with high metal ion conductivity deposited on some or all of the surfaces within the open carbon structure 210. In an embodiment, the dense electrolyte layer 218 is formed on one end of the carbon cathode 216 using p-µPECVD or slip/tape casting. In an embodiment the electrolyte is LAGP, though it may be any material suitable for conducting metal ions such as but not limited to ceramic, glass, polymer, polymer-ceramic composite, glass-ceramic composite, LATP, LLT, and YSZ.

The battery 200 further includes a gas diffusion layer 212 connected to the composite cathode 216. The gas diffusion layer 212 is optional and may simply be a portion of the carbon structure 210 of the composite cathode 216 upon which no electrolyte has been deposited. In the embodiment illustrated, the gas diffusion layer is a different carbon structure 210 having a different porosity in order to act as a manifold for getting gas into and out of the composite cathode 216. In an embodiment the gas diffusion layer 212 need not have a bimodal porosity distribution as the surface is not functional. The gas diffusion layer 212 also provides electrical connection between the composite cathode 216 and the cathode current collector 214. Similar to the carbon structure 210 in the cathode 216, the carbon structure in the gas diffusion layer 212 may utilize a lightweight support structure (not shown) of carbon, nickel foam, metal foam, aluminum mesh, metal mesh, and any other material suitable for use as a lightweight, electrically conductive support structure.

In an alternate embodiment, the disclosed technologies are applied to a high temperature solid oxide fuel cell. An electrolyte is deposited using p-µPECVD on some or all of the surfaces of a cathode structure, such as but not limited to LSM. In an embodiment the electrolyte comprises YSZ or cerium gadolinium oxide (CGO). The electrolyte is in electrical contact with an anode. In an embodiment the anode comprises nickel.

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

We claim:

1. A lithium-air battery comprising:
a lithium source layer:
a UPON layer in contact with the lithium source layer;
a gas porous composite cathode of a bimodal porous carbon layer deposited onto a support structure, the gas porous composite cathode having a first portion and a second portion; wherein a layer of solid electrolyte with lithium ion conductivity has been deposited within the bimodal porous carbon layer in the first portion and a thicker layer of solid electrolyte has been deposited on the second portion and the second portion in contact with the layer of LiPON; and
a gas diffusion layer comprising a porous conductive material in contact with the first portion of the gas porous composite cathode.

2. The lithium-air battery of claim 1 further comprising:
a cathode current collector connected to the gas diffusion layer, and
an anode current collector connected to the lithium source layer.

3. The lithium-air battery of claim 1 wherein the bimodal porous carbon layer is characterized by a pore distribution having two highest modes, wherein the two highest modes include a first peak in a first distribution having a first range of 2-50 nm and a second peak in a second distribution having a second range of 0.05 and 10 microns.

4. The lithium-air battery of claim 1, wherein the thicker layer of solid electrolyte layer comprises at least one of ceramic, glass, polymer, polymer-ceramic composite, glass-ceramic composite, LAGP, LATP, LLT, and YSZ.

5. The lithium-air battery of claim 4, wherein the thicker layer of solid electrolyte is 1 to 20 microns thick.

6. The lithium-air battery of claim 1, wherein the solid electrolyte with lithium ion conductivity deposited within the first portion of the gas porous composite cathode comprises at least one of ceramic, glass, polymer, polymer-ceramic composite, glass-ceramic composite, LAGP, LATP, LLT, and YSZ.

7. The lithium-air battery of claim 6, wherein the solid electrolyte with lithium ion conductivity deposited within the first portion of the gas porous composite cathode forms an electrolyte layer 100 nm to 10 micron.

8. The lithium-air air battery of claim 1, wherein the gas porous composite cathode layer comprises at least one of carbon, nickel foam, metal foam, aluminum mesh, metal mesh, YSZ, and LSM.

9. The lithium-air battery of claim 8, wherein the gas porous composite cathode comprises pores 2 to 30 nm in diameter.

10. The lithium-air battery of claim 9, wherein the gas porous composite cathode further comprises pores 100 nm to 1 micron in diameter.

11. The lithium-air battery of claim 1, wherein the support structure comprises at least one of carbon, nickel foam, metal foam, aluminum mesh, metal mesh, YSZ, and LSM.

* * * * *